May 28, 1963   W. L. WELLFORD, JR., ETAL   3,091,350
STORAGE BIN

Filed May 9, 1960   3 Sheets-Sheet 1

INVENTORS,
WALKER L. WELLFORD, JR.
ROBERT G. JORGENSEN
BY
Weatherford & Weatherford
attys

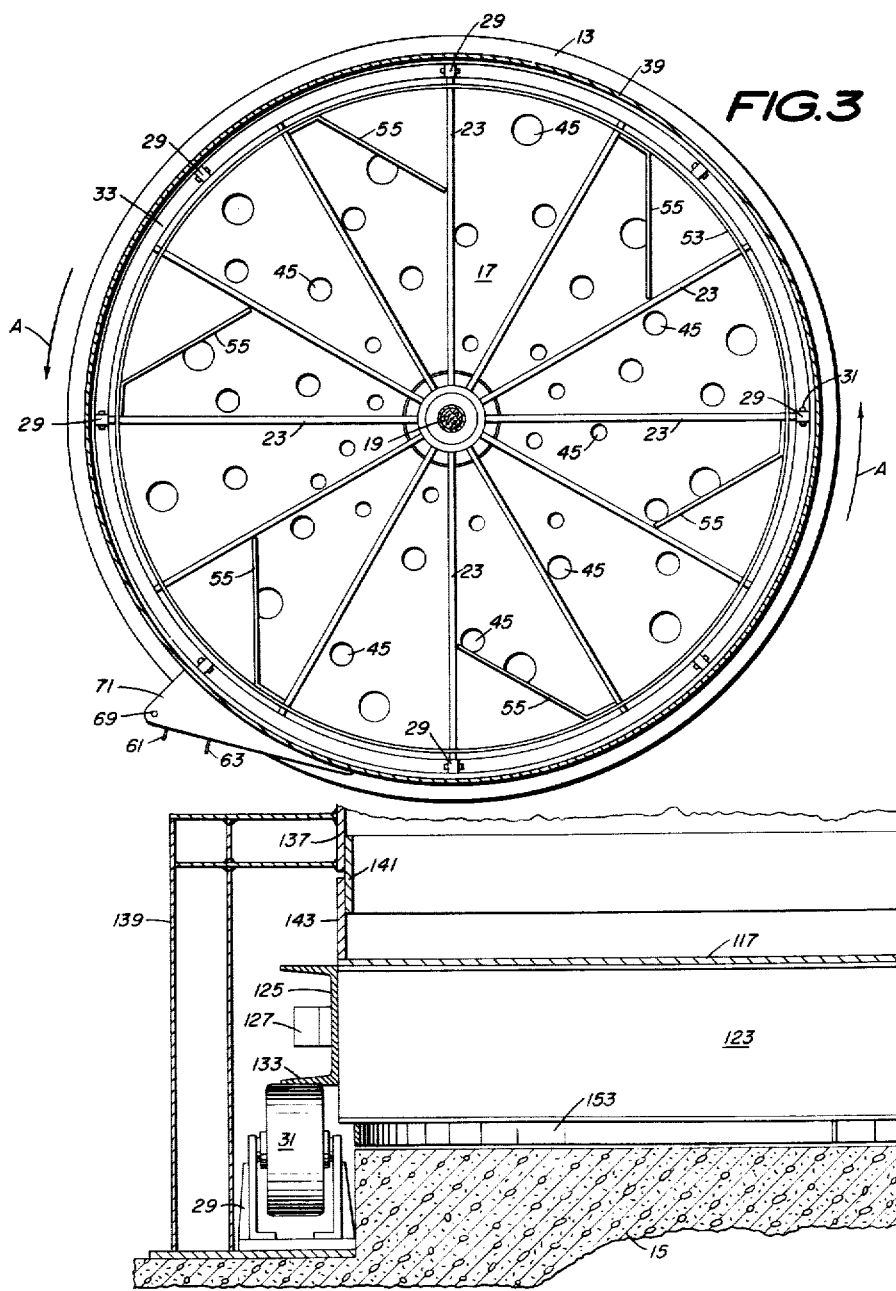

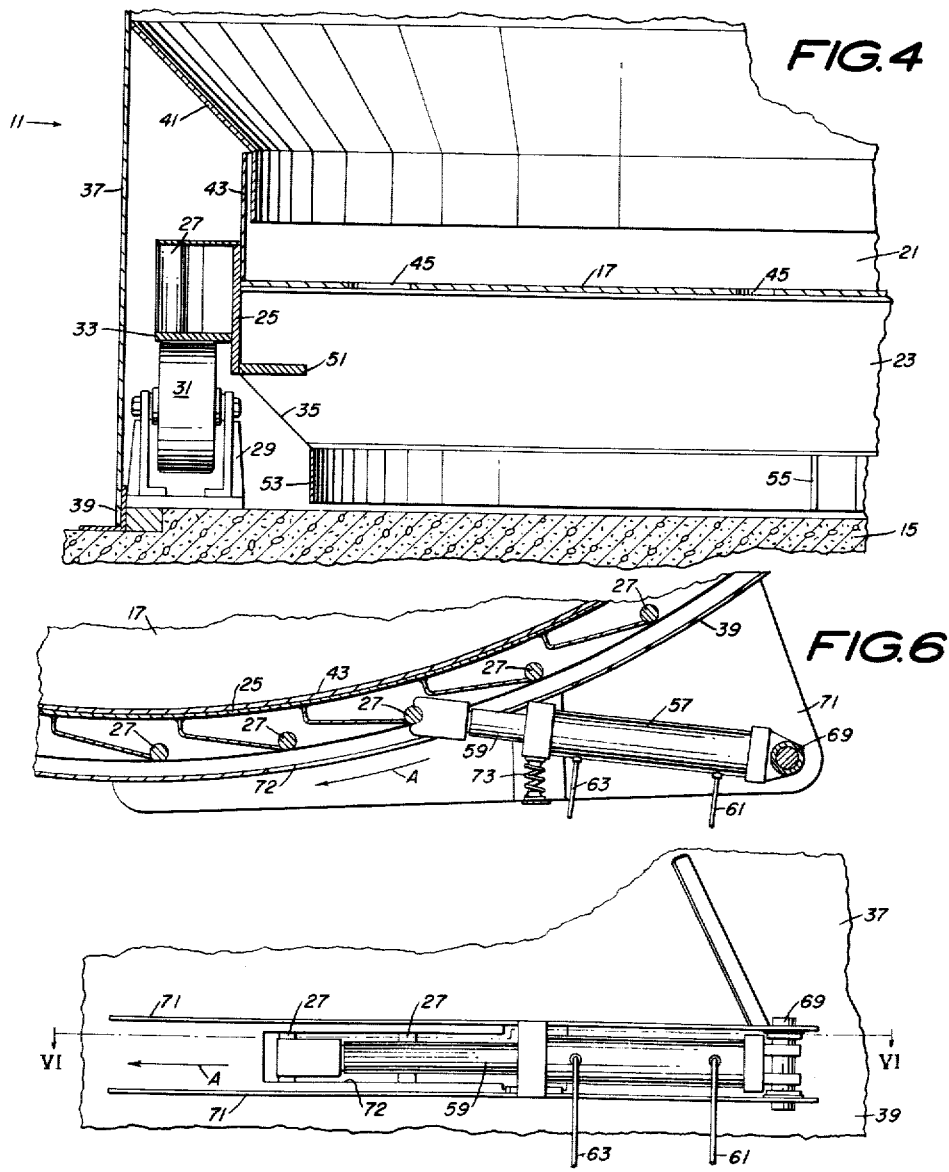

United States Patent Office 3,091,350
Patented May 28, 1963

3,091,350
STORAGE BIN
Walker L. Wellford, Jr., P.O. Box 2834, Memphis 2, Tenn., and Robert G. Jorgensen, P.O. Box 4776, Memphis 7, Tenn.
Filed May 9, 1960, Ser. No. 27,828
6 Claims. (Cl. 214—17)

This invention relates to certain new and useful improvements in storage bins, and particularly relates to improvements in storage bins adapted for storage and handling of divided solid materials which do not flow easily, such as wood chips, sawdust, seed corn, and other materials of comparable characteristics.

One of the principal problems heretofore encountered in storage bins utilized for the storage and handling of materials having the characteristics of materials such as those mentioned arises in the attempts to withdraw these materials from the storage bin and convey them to use areas away from the storage bins. Normally it is found that in materials of these general characteristics the mass of material introduced into the storage bin has a tendency to pack itself, and when removed from below by conveyor means or other discharge means, it is found that the material will be moved outwardly away from the storage bin adjacent the area of the conveyor, tending to leave an arching condition which supports the material above, leaves the conveyor bare, and effectively prevents the further discharge or withdrawal of material from the storage bin.

The purpose of the present invention is to provide a simple and facile means by which such arching condition can be prevented, and which will effectively insure the constant delivery of material as desired for withdrawal from the storage bin.

The principal object of the present invention is to provide a storage bin in which the lower end of the bin area is defined by a rotatable floor structure having suitable perforations formed therein for effectively distributing the withdrawal and discharge of material deposited in the bin above the floor.

A further object of the invention is to provide a bin having a rotatable floor and new and novel means for supporting the floor of the bin.

A further object of the invention is to provide a new and novel means for effecting rotation of a rotatable bin floor.

A further object of the invention is to provide means confining the material discharged through a perforated bin floor to concentrate upon a delivery conveyor; and A further object of the invention is generally to improve the design, construction and efficiency of storage bins particularly for the handling of solid materials which do not readily flow.

The means by which the foregoing and other objects of the present invention are accomplished and the manner of their accomplishment will be readily understood from the following specification upon reference to the accompanying drawings, in which:

FIG. 3 is an inverted sectional plan view taken as on the line III—III of FIG. 1.

FIG. 4 is a fragmentary sectional view on an enlarged scale as on the line I—I, with certain parts in elevation illustrating the relationship of the lower portion of the bin, the rotatable bin floor, their respective support means, and related parts.

FIG. 5 is a fragmentary side elevational view illustrating means for rotating the turntable floor.

FIG. 6 is a fragmentary sectional plan view taken as on the line VI—VI of FIG. 5; and FIG. 7 is a view similar to FIG. 4 showing details of a modified embodiment of the invention.

Figure 2:
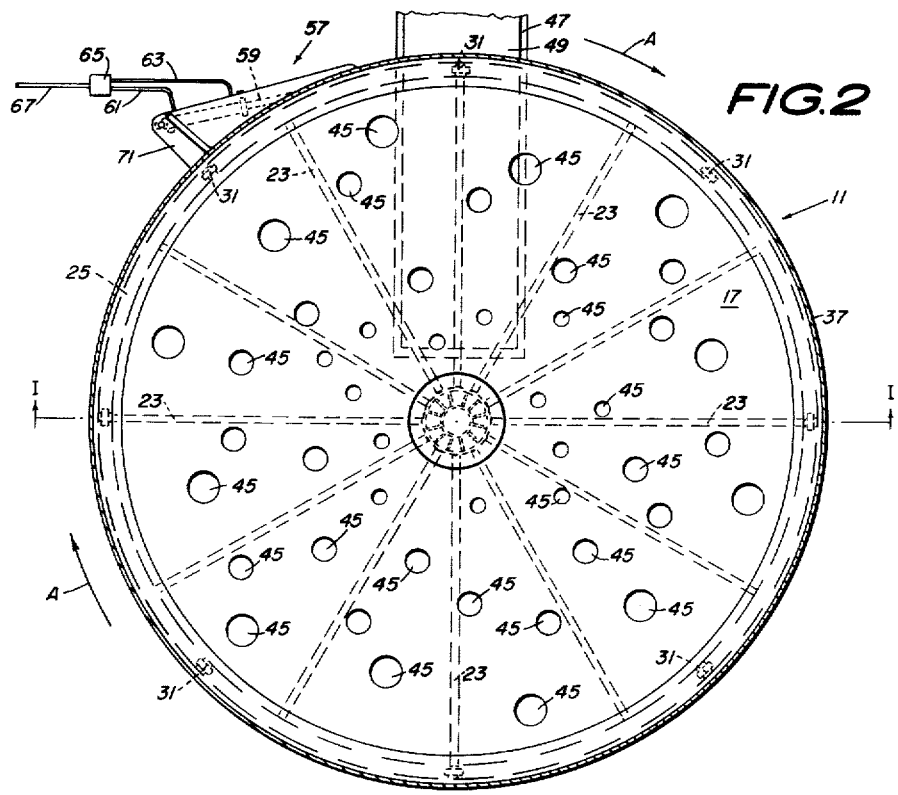
FIG. 2 is a fragmentary sectional plan view taken as on the line II—II of FIG. 1.

Referring now to the drawings in which the various parts are indicated by numerals, the present structure essentially comprises a tank-like body provided with an overlying roof for top closure, and with the tank body being supported below the roof from a discharge base which may be formed as a concrete flooring or other structure. Within the tank-like structure a bin area is defined by a turnable floor mounted adjacent the lower end of the tank-like structure, but spaced above the base, to provide for a lower space through which discharge may be effected.

Thus in the embodiment shown principally in the present drawings there is a tank-like structure 11, which is preferably of substantially cylindrical conformation, and is provided with an overlying cap or roof 13. Underlying the body of the tank-like structure is a concrete support base 15. It will be understood that, while it is convenient to form support base 15 as of concrete, other suitable materials may be utilized without departing herefrom.

Spaced slightly above support base 15 is a turnable floor 17 which is mounted for rotation relative to base 15 upon suitable central bearing means 19. It will be seen that as floor 17 is mounted for rotation spaced above base 15 and positioned adjacent the lower end of tank structure 11 a storage bin area 21 is thereby defined.

Rigidly secured to central bearing means 19 and extending radially outwardly therefrom are a plurality of beams 23 which are secured to floor 17 and extend outwardly beneath the surface of the floor so as to maintain the surface from the central bearing means. To the radially outer ends of beams 23 a peripheral channel member 25 is fixed and extends circumferentially around floor 17. As shown best in FIG. 4, peripheral channel 25 is a composite channel which is outwardly open away from floor 17.

At spaced intervals about channel 25, vertically disposed lugs 27 are rigidly fixed to channel 25 and are circumferentially spaced about the periphery of floor 17. Mounted upon base 15 at a plurality of circumferentially spaced intervals are roller supports 29, in each of which roller supports 29 a roller 31 is rotatably supported. The lower flange 33 of peripheral channel 25 is supported upon rollers 31 so as to maintain the periphery of turnable floor 17 in a supported condition, and also to provide for the turnable rotation of floor 17. For convenience of location, each of the floor beams 23 is truncated as at 35 to provide clearance for passage relative to roller supports 29 and rollers 31.

Figure 1:
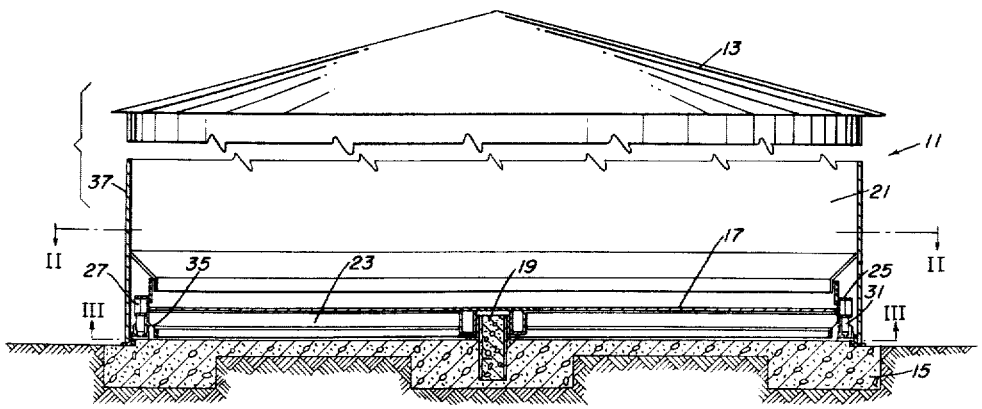
FIG. 1 is a fragmentary front view of an embodiment of the present invention, partly in elevation, and partly in section as on the line I—I of FIG. 2.

In the embodiment shown in FIGS. 1 and 4 of the drawings, tank-like structure 11 includes a main body 37 which extends above floor 17 and is overlain by roof 13, and which is supported from base 15 by support means 39 which may as shown be formed integrally with the main body of the tank and which extends downwardly to seat upon base 15 in order to effect external support of the tank-like structure. It will be understood that, while in this embodiment of the invention support means 39 and tank body 37 are shown as integrally and continuously formed, the support means may be separately formed without departing from the spirit of this invention.

It will further be observed that in the embodiment shown in FIGS. 1 to 4, inclusive, roller supports 29 and the rollers supported thereon are mounted within support means 39. However, it will be understood, as will hereinafter be described particularly with reference to FIG. 7, that the support means may be otherwise formed relative to the roller supports without departing herefrom.

Within tank body 37, and approximately adjacent but slightly above the junction of the tank body 37 with support means 39, a protective shield 41 is fixed to tank body 37 and extends downwardly therefrom shielding the area in which rollers 31 are positioned in order to effectively prevent the undesired introduction of material from the which may as shown be formed integrally with the main bin area into the area of the rolers. In the embodiment of protective shield 41 as shown particularly in FIG. 4, it will be seen that the shield is a substantially funnel-shaped member which extends inwardly and downwardly from tank body 37, being connected to the tank body substantially adjacent the junction of the tank body with support means 39. Shield 41 at its lower extremity extends downwardly within an upstanding flange 43 which is carried by the composite rotatable floor structure including the floor beams and the peripheral channel. Thus as the composite floor structure is rotated any material deposited from the bin area toward the floor surface is confined to fall onto the floor surface and is restrained from introduction into the roller area.

In order to provide for the discharge of materials delivered downwardly onto floor 17, the floor is provided with a plurality of apertures 45 which are downwardly open and effectively communicate the bin area 21 with the underlying base 15. As shown in FIG. 2, the apertures 45 are preferably distributed both in a radial and a circumferential manner throughout the surface of the rotatable floor 17. It is preferred that base 15 be provided with a pit 47 which is of width to receive and house a conveyor 49, pit 47 and conveyor belt 49 extending substantially radially away from the center of the structure and in a limited part thereof only, as is best shown in FIG. 2.

It is desirable that the materials discharged from the bin area 21 onto base 15 should be confined away from accidental engagement with the rollers, and furthermore that such materials be confined so as to be delivered to pit 47 for transmission by conveyor 49 away from the storage bin. For this purpose further plates 51 are provided, plates 51 being preferably substantially horizontally disposed, and being rigidly secured to and extending between adjacent floor beams 23 being positioned above the level of the truncated parts 35 of the floor beams and spanning between the vertical webs of the floor beams so as to minimize any accidental discharge of bin material outwardly toward the roller area.

Below plates 51, an annular ring 53 is secured to the lower portions of floor beams 23 and extends downwardly therefrom toward base 15. Annular ring 53 thus provides an additional shield against the lateral discharge of bin material toward the roller area. Preferably ring 53 is provided with a plurality of angularly inwardly extending deflectors 55, as best shown in FIG. 3, the deflectors 55 being angularly disposed in a somewhat trailing direction relative to the direction of rotation of floor 17, indicated by the arrows A shown in FIGS. 1, 2, 3, 5 and 6.

It will be understood that it is essential for the preferred operation of the present invention that floor 17 be rotated relative to the bin area. It will be seen that upon such rotation the floor apertures 45 will be effective to permit the gravity discharge of material downwardly from the bin area and furthermore that the rotation of the floor with its variously positioned floor apertures will be effective to contribute to this gravity discharge by giving a base agitation to the bin contained material, thus effectively preventing the building up of supporting arch-like parts which might otherwise maintain the bin material above the floor and prevent the discharge downwardly onto the conveyor. It will be understood that, while the apertures here shown are circular and are of varying diametral sizes, that the apertures may be formed of other geometrical shapes without departing herefrom, this varied formation depending upon the materials that may be handled by the bin, and the variations in cross sectional size may also be varied or made uniform as desired under use conditions.

Inasmuch as the rotation of floor 17 is desirable for the proper operation of this device, means for rotating the floor should be provided therefor. In the embodiment shown there is an hydraulic cylinder and piston assembly 57 including a reciprocable plunger 59, assembly 57 being supplied with hydraulic fluid under pressure as through lines 61, 63 leading to the opposite ends of the hydraulic cylinder of the assembly from a conventional reciprocating valve 65 to which fluid under pressure may be supplied as from a line 67 from a source of hydraulic pressure not shown. This arrangement is substantially conventional and is somewhat schematically shown in FIG. 2.

As best shown in FIG. 6, hydraulic assembly 57 is pivotally mounted as at 69 between a pair of supports 71 connected with the tank support means 39. The distal end of plunger 59 is disposed for successive engagement with the pin-like lugs 27, extending through a slot 72 formed in support 39, and upon each stroke of the plunger the engaged lug is moved in the direction of rotation indicated by arrow A, particularly as shown in FIG. 6. Upon the full extent of the stroke as to the position shown in FIG. 5 the reciprocating valve causes the reverse action of the plunger, to move reversely into a position to pick up the next succeeding lug 27, and it will be observed that a compression spring 73 is interposed between the assembly supports and the assembly 57, urging the assembly inwardly toward the lugs and thus insuring the successive positioning of the plunger for reengagement with a next succeeding lug.

It will be seen that this is a convenient and simple means of effecting rotation of floor 17, and as it is intermittently moved forwardly by the reciprocating action of the hydraulic assembly 57 the support of the floor upon rollers 31 and the central bearing support of the floor at 19 permit the floor to move smoothly in a substantially continuous pattern of rotation. It will be understood that, while this simple and efficient means is here illustrated, other means of effecting rotation of the floor 17 may be employed without departing from this invention.

As the floor is thus rotated the apertures 45 underlying the material in the bin area are effective to form a base agitation of the material so as to keep it sufficiently loosened to prevent packing or arching, and to cause discharge of the same downwardly onto the floor, and thence downwardly through the apertures onto base 15. In this downward discharge the bin contained material is inwardly confined by shield 41, and plates 51, to fall into the area defined by annular ring 53. As the floor is rotated and the ring is carried therewith deflectors 55 act upon the bin material which has been downwardly discharged, moving it toward the central part of the device and away from the peripheral edge of the device, and thence to downwardly drop into pit 47 and onto conveyor belt 49 for movement outwardly and away from the storage bin.

In FIG. 7 a modification of the device is shown in which the main body of the tank terminates as at 137. To the lower end of the tank, support means 139 are rigidly fixed.

Preferably support means 139 comprise a plurality of circumferentially spaced minor housings which are spaced outwardly from the periphery of the tank body. Interiorly of the lower end 137 of the tank a downwardly extending protective shield 141 is rigidly fixed, shield 141 extending downwardly and overlapping the upper end of an upstanding flange 143 carried by the composite floor structure of this device.

Underlying the floor 117 are floor beams 123 similar to the beams 23 and carrying a downwardly extending annular ring 153 preferably provided with deflectors similar to the deflectors 55. Connected to the composite floor assembly is a peripheral channel 125, the lower flange 133 of which rests upon rollers 31 so as to support the periphery of the floor structure.

Within channel 125, lug means 127 are rigidly fixed for engagement by an assembly like assembly 57 to effect rotation of the turnable floor. Such an assembly is mounted to support means 139 and extends directly into engagement with the outwardly exposed lugs successively in manner similar to the plunger engagement with lugs 27 heretofore described.

We claim:

1. In storage bin means, a substantially cylindrical covered tank body, a base underlying said tank body, a turnable floor having apertures and rotatably supported spaced above said base adjacent the lower end of said body, said floor and tank body thereabove defining a bin area, support means seated on said base and connected to the lower end of said tank body supporting said body from said base, roller means mounted on said base inwardly of said support means, said floor including a peripheral channel about its outer periphery, said channel having a lower substantially horizontal flange supported on said roller means to support the periphery of said floor while maintaining the rotatable character of said floor, shield means connected to said tank body adjacent its lower end, said shield means extending downwardly inwardly of said roller means, an upstanding flange extending upwardly from said floor means closely adjacent to and outwardly of said shield means, said upstanding flange and said shield means cooperating to guide material from said bin area onto said floor and away from said roller means, material from said bin area dropping through the apertures in said floor onto said base, an annular ring depending from said floor toward said base, a plurality of inwardly extending angularly disposed deflectors fixed to said ring beneath said floor, means for rotating said floor, and conveyor means sunk in a pit beneath said floor, said deflectors being angled in a trailing direction relative to the direction of floor rotation, rotation of said apertured floor maintaining a base agitation of material in said bin area to prevent packing and arching thereof and moving said deflectors to urge material toward said pit.

2. In storage bin means, a tank body, a base underlying said tank body, a turnable floor having apertures and rotatably supported spaced above said base adjacent the lower end of said body, said floor and tank body thereabove defining a bin area, support means seated on said base and connected to the lower end of said tank body supporting said body from said base, roller means mounted on said base adjacent said support means, said floor including means about its outer periphery supported on said roller means to support the periphery of said floor while maintaining the rotatable character of said floor, means respectively connected to said tank body adjacent its lower end and to said floor means cooperating to guide material from said bin area onto said floor and away from said roller means, material from said bin area dropping through the apertures in said floor onto said base, an annular ring depending from said floor toward said base, a plurality of inwardly extending angularly disposed deflectors fixed to said ring beneath said floor, means for rotating said floor, and conveyor means sunk in a pit beneath said floor, said deflectors being angled in a trailing direction relative to the direction of floor rotation, rotation of said apertured floor maintaining a base agitation of material in said bin area to prevent packing and arching thereof and moving said deflectors to urge material toward said pit.

3. In a storage structure, a shell member defining a storage cavity therein, a foundation supporting said shell member and closing the bottom thereof, a rotatable unloader floor disposed in the bottom of said cavity within said shell member, a peripheral drive means for rotating said floor, said floor having a plurality of apertures therein, each of said apertures being completely open directly to the products stored in said cavity so that the portion of the floor surface bordering each aperture is free to engage and dislodge said products, thereby causing said products to pass downwardly through said apertures as said floor is rotated, and means disposed beneath said floor to carry off the stored material dislodged by said floor.

4. Apparatus for storing and discharging divided solid material having a tendency to pack tightly and to form arches comprising, in combination, a stationary base, wall means supported on said base and forming the sides of a cavity, a rotatable unloader floor near the bottom of said cavity, said floor being perforated and serving to support the material stored in said cavity, a ratchet drive for rotating said floor, said drive including a hydraulic actuator and ratchet means connected to said floor, engaged by said actuator, for rotating said floor, said perforations in said floor being spaced apart both radially and circumferentially said floor acting, as it rotates, to wipe its perforated surface across the bottom of said stored material, to dislodge said material, and to cause it to drop by gravity through said perforations onto said base, said floor and said base defining a lower chamber bounded above by said rotating floor and below by said stationary base, a conveyor sunk in said base for discharging said material from said lower chamber, and means depending from said rotating floor for advancing material in said lower chamber along said base to said conveyor so that it may be discharged by said conveyor.

5. In a storage structure for storing and discharging divided solid material of a type tending to pack and to form arches, in combination, a stationary base, wall means supported on said base defining therein a storage cavity for receiving said material, a rotating circular floor supported for rotation within said storage structure on a vertical axis above said base, said floor comprising a smooth-topped member having perforations therein, a drive for rotating said floor, said floor being adapted to rotate underneath said material and to support it in said storage cavity while transmitting controlled quantities thereof downwardly through said perforations, thereby preventing packing and arching of said material in the region below said floor, a conveyor underneath said floor, for removing material from the region between said base and said floor, and means beneath said rotating floor for advancing said material along said stationary base to said conveyor.

6. In a storage structure for storing and discharging divided solid material of a type tending to pack and to form arches, in combination, a shell member comprising wall means defining a storage bin therein, base means supporting said shell member and closing the bottom thereof, a perforated rotatable unloader floor disposed in the bottom of said shell member, a peripheral drive means for rotating said floor intermittently in steps, said drive including a reciprocable actuator cooperatively engaging with ratchet means on the periphery of said floor, said floor having an upper surface free from projections and smooth except for said perforations, and said perforations being spaced apart both radially and circumferentially, said floor being adapted to bear the weight of said solid material stored in said cavity and to maintain said material above it, and, as it rotates, to wipe its perforated surface across substantially the entire bottom of said stored material, whereby the portion of the floor surface bordering each perforation is free to engage and dislodge said material and cause it to drop by gravity through said perforations, and means beneath said floor to carry off the stored material dropping through said perforations in said rotating floor.

References Cited in the file of this patent

UNITED STATES PATENTS

| | | |
|---|---|---|
| 1,936,105 | Cole | Nov. 21, 1933 |
| 2,718,970 | Dueringer | Sept. 27, 1955 |
| 2,755,942 | Broberg | July 24, 1956 |
| 2,767,884 | Gross | Oct. 23, 1956 |

FOREIGN PATENTS

| | | |
|---|---|---|
| 352,436 | Germany | Apr. 27, 1922 |

UNITED STATES PATENT OFFICE

CERTIFICATE OF CORRECTION

Patent No. 3,091,350                                                            May 28, 1963

Walker L. Wellford, Jr., et al.

It is hereby certified that error appears in the above numbered patent requiring correction and that the said Letters Patent should read as corrected below.

Column 2, line 9, for "turntable" read -- turnable --; column 3, line 22, strike out "which may as shown be formed integrally with the main"; line 23, for "rolers" read -- rollers --.

Signed and sealed this 31st day of December 1963.

(SEAL)
Attest:
ERNEST W. SWIDER

Attesting Officer

EDWIN L. REYNOLDS

Acting Commissioner of Patents